Patented Feb. 10, 1931

1,791,959

UNITED STATES PATENT OFFICE

WILLIAM FELDENHEIMER, OF LONDON, ENGLAND

PURIFICATION AND TREATMENT OF CLAY

No Drawing. Application filed October 30, 1925. Serial No. 65,894.

Various processes have been proposed for purification and treatment of clay by deflocculation followed by flocculation. All such processes heretofore proposed have had the commercial disadvantage of producing a product which is more expensive than clay washed by the ordinary sedimentation processes.

My present invention is designed to purify and treat clay by deflocculation followed by flocculation in connection with sedimentation and filtering at a cost of production much lower than that heretofore possible. It is based upon the fact that the step of deflocculation greatly increases the fluidity of the clay suspension. In carrying out my improved method I deflocculate the clay slip prior to or during its passage through the troughs or "mica drags" or whatever apparatus is employed for its purification and after its passage I flocculate and thicken it, so that the time of filter pressing and drying is considerably reduced.

In the ordinary process of cleaning and purifying clays by washing as practiced in Georgia, for example, a clay slip of not more than 5% of clay to water is passed through the troughs or "mica drags" to remove the coarse impurities by sedimentation. If it were attempted to use a higher concentration of clay the clay slip would be of too high viscosity to drop the grit behind in the troughs.

But by deflocculating the clay prior to or during its passage over the troughs I can increase the clay concentration in the water suspension at least 4 or 5 times that heretofore employed, and this slip being made much less viscous and more fluid by the deflocculating action, can be passed through the troughs and screens and will still deposit the grit and impurities in a desired manner owing to the liquefaction effect of the deflocculator. Hence 4 to 5 times the quantity of clay to be washed and purified can be passed through the plant in a given time with a corresponding saving in labor and working costs and a corresponding increase in output.

The deflocculating process has also heretofore increased the cost of production by reason of the slowness of drying as compared with untreated clay. In the filter pressing of deflocculated clay usually twice the time or more was required for this operation. But by using a suitable flocculator and thickener and treating the deflocculated clay after passage over the troughs I can reduce the time for filter pressing to that heretofore used for untreated clay or even use less time.

For example, a Georgia clay from the Gordon district of Georgia was deflocculated by using 5½ pounds of the sodium sulphide (60% solution) and 5½ pounds of oxalic acid in solution for every ton of clay treated. The clay as dug from the ground was introduced into the mixer and water added to produce a slip containing about 20 parts by weight of clay to 80 parts by weight of water. The solution of deflocculator added to the slip was pumped to the first part of the troughs. Ordinarily the maximum slip concentration that could be pumped into the troughs and over the screens has 5 or 6 parts of clay to every 94 or 95 parts or so of water, but owing to the liquefaction caused by the deflocculator the troughs and screens operated properly and the desired separation was obtained.

After the deflocculated clay slip had passed through the troughs and over the screens it was flocculated by adding 10½ pounds of commercial hydrochloric acid for every ton of clay present in the slip. The clay slip was then allowed to settle in the vats until it reached a concentration of 33⅓% of clay to that of water. The supernatant water was removed and the clay slip was pumped to the filter press. In this case more than twice the time to press the slip was required than would have been taken had the clay slip been untreated and washed and settled in the ordinary manner.

But when the same deflocculated clay was flocculated by 10½ pounds of commercial hydrochloric acid in the presence of 10 pounds of lime as a thickener the time of filter pressing was reduced to slightly less than that used for filter pressing untreated clay. The lime in this case was admixed in the clay slip and the clay slip allowed to take up as much lime as it would by standing over night, the excess lime then being removed. The finished product should be as nearly neutral as possible for most commercial uses.

Good results were also obtained by flocculating with magnesium chloride and magnesia.

In order to reduce the time of filter pressing the flocculator should not only rapidly settle out of the clay, but also thicken the clay slip.

It will be understood that the process will be varied when used upon different clays as different clays require changes in the treatment. The essential feature, however, of my invention lies in liquefying by deflocculation of the clay slip, then separating out the impurities and then flocculating and thickening prior to filter pressing or whatever step is used for dewatering the clay and drying.

It will be understood that the term "purifying" is used herein to mean freeing the clay from grit, mica, sand or other impurities in a known manner.

The advantages of my invention will be obvious to those skilled in the art since the time and cost of purifying are reduced and the output greatly increased. A better product is also afforded.

I claim:

1. In the treatment of clay, the steps consisting of deflocculating a liquid suspension of the same, separating out impurities, flocculating and thickening the slip with reagents in quantities which render the slip non-acidic, and thereafter removing the clay from the liquid.

2. In the purification of clay to obtain a non-acidic product, the steps consisting of making a liquid suspension of the clay, increasing the fluidity of the suspension by deflocculation, separating out the impurities, adding a flocculator and a thickener in quantities which react to yield a non-acidic product, and thereafter removing the liquid.

3. In the treatment of earthy minerals, the steps consisting of deflocculating a liquid suspension of the same, separating out impurities, adding hydrochloric acid and lime to the slip to respectively flocculate and thicken it in quantities which neutralize the hydrochloric acid, and thereafter separating the earthy minerals.

4. In the treatment of earthy minerals the steps consisting of deflocculating a liquid suspension of the same, separating out impurities, flocculating and thickening the slip by the addition of hydrochloric acid and an excess of lime, allowing the slip to stand for several hours, removing the excess lime, and thereafter separating the earthy minerals.

5. In the treatment of earthy minerals, the steps consisting of deflocculating a liquid suspension of the same, separating out impurities, flocculating and thickening the slip by the addition of about ten and one-half pounds of commercial hydrochloric acid and about ten pounds of lime for each ton of clay present in the slip, allowing the slip to stand for several hours, removing the excess lime, and thereafter separating the earthy minerals.

6. In the treatment of earthy minerals, the steps consisting of deflocculating a liquid suspension of the same, separating other impurities, adding a flocculating agent and a thickening agent in quantities which neutralize the flocculating agent, and thereafter separating the earthy minerals.

In testimony whereof I have hereunto set my hand.

WILLIAM FELDENHEIMER.